United States Patent
Monnerat et al.

(10) Patent No.: US 12,457,050 B2
(45) Date of Patent: *Oct. 28, 2025

(54) ADVERTISEMENT TRACKING

(71) Applicant: Comcast Cable Communications, LLC, Philadelphia, PA (US)

(72) Inventors: Edward D. Monnerat, Parker, CO (US); Mehul S. Patel, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,629

(22) Filed: Sep. 8, 2023

(65) Prior Publication Data

US 2023/0421277 A1    Dec. 28, 2023

Related U.S. Application Data

(63) Continuation of application No. 17/714,671, filed on Apr. 6, 2022, now Pat. No. 11,799,575, which is a continuation of application No. 17/197,703, filed on Mar. 10, 2021, now Pat. No. 11,329,742, which is a continuation of application No. 16/106,207, filed on Aug. 21, 2018, now Pat. No. 10,979,162, which is a continuation of application No. 15/397,329, filed on Jan. 3, 2017, now Pat. No. 10,084,557, which is a continuation of application No. 13/795,919, filed on Mar. 12, 2013, now abandoned.

(51) Int. Cl.
*H04N 21/81* (2011.01)
*H04H 60/33* (2008.01)
*H04N 21/433* (2011.01)
*H04N 21/442* (2011.01)
*H04N 21/462* (2011.01)
*H04N 21/658* (2011.01)
*H04H 60/63* (2008.01)

(52) U.S. Cl.
CPC ........ *H04H 60/33* (2013.01); *H04N 21/4333* (2013.01); *H04N 21/44222* (2013.01); *H04N 21/44224* (2020.08); *H04N 21/462* (2013.01); *H04N 21/6582* (2013.01); *H04N 21/812* (2013.01); *H04H 60/63* (2013.01)

(58) Field of Classification Search
CPC .... H04H 60/33; H04H 60/63; H04N 21/4333; H04N 21/44222; H04N 21/44224; H04N 21/462; H04N 21/6582; H04N 21/812
See application file for complete search history.

(56) References Cited

U.S. PATENT DOCUMENTS

| | | |
|---|---|---|
| 6,621,524 B1 | 9/2003 | Iijima et al. |
| 8,190,474 B2 | 5/2012 | Lerman et al. |
| 8,306,859 B2 | 11/2012 | Lerman et al. |

(Continued)

*Primary Examiner* — John R Schnurr
(74) *Attorney, Agent, or Firm* — Banner & Witcoff, Ltd.

(57) ABSTRACT

Methods, systems, and computer-readable media for determining the efficacy of an advertisement are described herein. A computing device may receive an advertisement from an advertisement server. The computing device may determine advertisement information associated with the presentation of the advertisement. The computing device may initiate a response to the advertisement information. The advertisement information may be sent to the advertisement server.

64 Claims, 12 Drawing Sheets

(56) References Cited

U.S. PATENT DOCUMENTS

| | | |
|---|---|---|
| 10,084,557 B2* | 9/2018 | Monnerat ........ H04N 21/44222 |
| 11,799,575 B2* | 10/2023 | Monnerat .............. H04H 60/33 |
| 2002/0063727 A1 | 5/2002 | Markel |
| 2002/0087403 A1 | 7/2002 | Meyers et al. |
| 2006/0111970 A1 | 5/2006 | Hill et al. |
| 2006/0271877 A1* | 11/2006 | Theurer .................. G06F 9/451 |
| | | 715/781 |
| 2007/0162428 A1 | 7/2007 | Williams et al. |
| 2007/0217130 A1 | 9/2007 | Eri |
| 2009/0077579 A1 | 3/2009 | Li et al. |
| 2009/0193355 A1 | 7/2009 | Tada |
| 2010/0005403 A1 | 1/2010 | Rozmaryn et al. |
| 2010/0131355 A1 | 5/2010 | Kitchen et al. |
| 2011/0035274 A1 | 2/2011 | Goel et al. |
| 2011/0113354 A1 | 5/2011 | Thiyagarajan et al. |
| 2011/0145856 A1 | 6/2011 | Agarwal et al. |
| 2012/0032979 A1 | 2/2012 | Blow et al. |
| 2012/0272258 A1 | 10/2012 | Bedi |
| 2013/0018731 A1 | 1/2013 | Morris et al. |
| 2013/0185164 A1* | 7/2013 | Pottjegort .............. G06Q 30/02 |
| | | 705/14.73 |
| 2013/0347018 A1 | 12/2013 | Limp et al. |
| 2014/0078402 A1 | 3/2014 | Weast |
| 2014/0139742 A1 | 5/2014 | Krishna et al. |
| 2014/0181634 A1 | 6/2014 | Compain et al. |
| 2015/0199708 A1 | 7/2015 | Ying et al. |
| 2016/0180512 A1 | 6/2016 | Myers et al. |
| 2017/0228762 A1 | 8/2017 | Riviello et al. |
| 2018/0114175 A1 | 4/2018 | Fei et al. |

* cited by examiner

```
content= number of seconds of content that have played so far;
audio_level= audio level of content one second before ad begins;
obscurity= level of obscurity of display area one second before ad begins;
z-order= z-order of display area one second before ad begins;
ad_content=number of seconds in the ad void function configuration
for (x=0; x<=; x++; x<= ad_content; audio_level; obscurity; z-order)
{ad_audio_level = audio level of ad content currently playing;
 ad_obscurity = level of obscurity of display area of ad content currently playing
 ad_z-order = z-order of display area of ad content currently playing if (ad_audio_level < audio_level)
    print "User lessened volume at " x " seconds into the ad.";
 if (ad_obscurity > obscurity)
    print "User obscured ad at " x " seconds into the ad.";
 If (ad_z-order < z-order)
    print "User was engaged in a different window at" x " seconds into the ad.";
}
```

FIG. 10A

| Step | Decision | Action |
|---|---|---|
| 1 | If audio level is lessened during ad | Report lessening of audio level at time lessened |
| 2 | If display area obscured during ad | Report obscuring of display area at time obscured |
| 3 | If z-order of display area lessened during ad | Report lessening of z-order of display area at time lessened |

FIG. 10B

ADVERTISEMENT TRACKING

CROSS-REFERENCE TO RELATED APPLICATIONS

This application is a continuation of and claims priority to U.S. patent application Ser. No. 17/714,671 filed on Apr. 6, 2022, which is a continuation of U.S. patent application Ser. No. 17/197,703 filed on Mar. 10, 2021 (now U.S. Pat. No. 11,329,742), which is a continuation of U.S. patent application Ser. No. 16/106,207 filed on Aug. 21, 2018 (now U.S. Pat. No. 10,979,162), which is a continuation of U.S. patent application Ser. No. 15/397,329 filed on Jan. 3, 2017 (now U.S. Pat. No. 10,084,557), which is a continuation of U.S. patent application Ser. No. 13/795,919 filed on Mar. 12, 2013 (now abandoned), each of which is hereby incorporated by reference in its entirety.

BACKGROUND

Advertisers in many industries have long sought to determine the efficacy of their advertisements and to make their advertisements more effective on viewers. These advertisers pay millions of dollars to have their ads presented during consumption of audio and/or video content, in the hopes that their ads are noticed by the user. There is an ever-present need, however, to help these advertisers in gauging the effectiveness of their ads.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a display device which shows video content with advertisement portions may monitor user actions during the advertisement to determine the efficacy of the advertisement. Electronic advertisements may be presented to users via various transmission media, such as a digital video multicast or broadcasts, video-on-demand, Internet web sites, or other software applications. During the presentation of an advertisement, the device may monitor many possible actions a user may take such as, changing the audio level of the advertisement during play, obstructing the advertisement, or changing the z-order (e.g., the order determining which application remains visible when two applications overlap in the display area) of the window containing the advertisement. The display device may track all these user actions and write them to an advertisement efficacy file report along with the time of the action. That report can then be sent to an advertisement server for further processing to determine the advertising effectiveness.

According to additional aspects, a display device which shows a video content with advertisement portions may restrict user action during an advertisement via instructions in a configuration file sent from a content server to the display device with the advertisement. These restrictions may include a prohibition on muting the advertisement or prohibiting the lessening of the audio level of the advertisement past a certain predetermined level, ensuring that the advertisement (or a predetermined portion of the advertisement) display is not obscured by other onscreen interfaces, restricting resizing of the advertisement, or other options described herein. Advertisers may dictate the instructions to be placed in the configuration file based on certain options indicated by the content server that serve the requirements of the advertiser and the display device.

According to additional aspects, a display device that displays or presents video content with advertisement portions may respond to a user action with another action. For example, if a user lessens the audio level of an advertisement during play, the device may respond by activating closed-captioning for the duration of the advertisement. Alternatively, the device may pause the video content until the user raises the audio level to a certain level. The various user interaction levels may also be included in the report to the advertisers.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein:

FIGS. 10a and 10b illustrate embodiments of configuration files used to instruct the display device.

DETAILED DESCRIPTION

As will by one of skill in the art upon reading the following disclosure, various aspects described herein may be appreciated embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
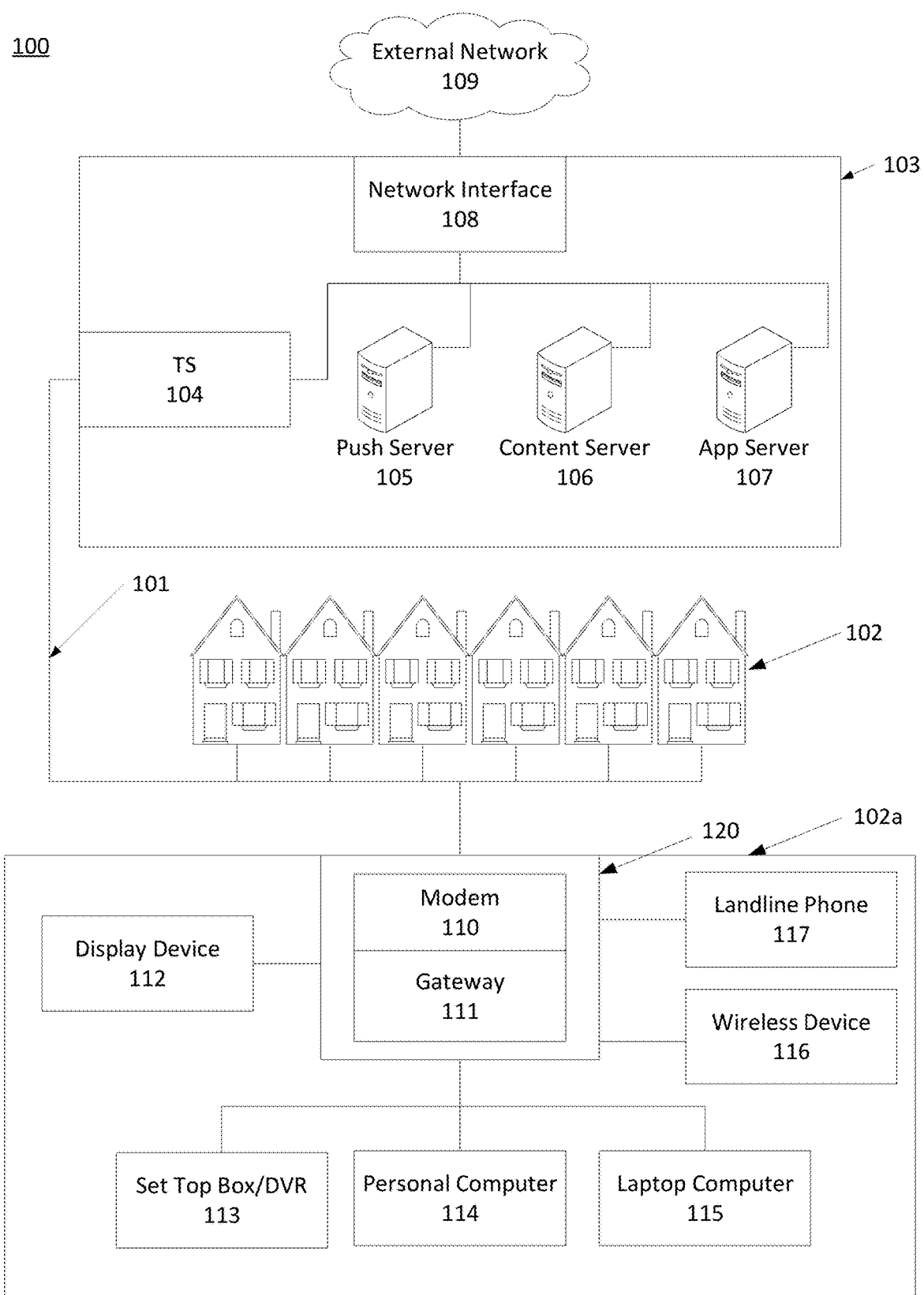
FIG. 1 illustrates an example system in which various features discussed herein may be implemented.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
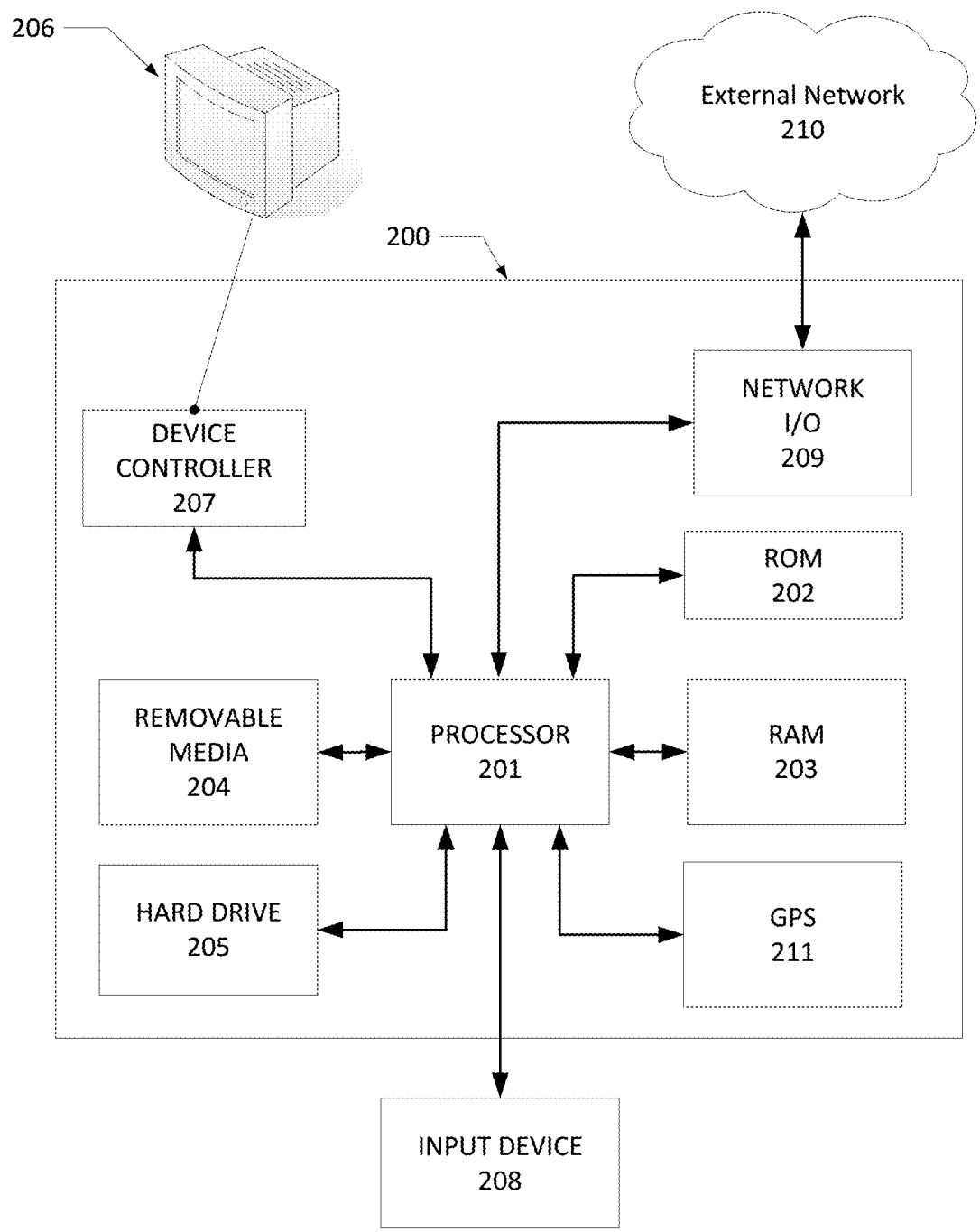
FIG. 2 illustrates an example computing device and network environment that may be used to implement one or more aspects of the disclosure.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

FIG. 2 shows an example hardware configuration. Modifications may be made to add, remove, combine, divide, etc., components as desired, and some or all of the elements may be implemented using software. Additionally, the components illustrated may be implemented using basic display devices and components, and the same components (e.g., processor 201, ROM 202, user input/output devices 206, etc.) may be used to implement any of the other display devices and components described herein. For example, the various components herein may be implemented using display devices having components such as a processor executing computer-executable instructions stored on a computer-readable medium (e.g., storage 205), as illustrated in FIG. 2.

Having described examples of network environments and content consumption devices that may be used in implementing various aspects of the disclosure, several examples illustrating how a display device may monitor user actions during an advertisement, a display device may restrict a user's control of the display device during an advertisement, and efficacy file reports are created and used will now be described in greater detail. The consumption device, which may be a user's tablet computer, personal computer, smartphone, DVR, etc., may monitor any client-side interaction with the user during an advertisement, such as detecting a change in audio level or z-order of display elements. A configuration file with such instructions may be developed by an advertisement server and sent to a content server to store with an advertisement that will be sent to the display device. In other examples, the display device may prohibit a user from muting an advertisement during play.

Figure 3:
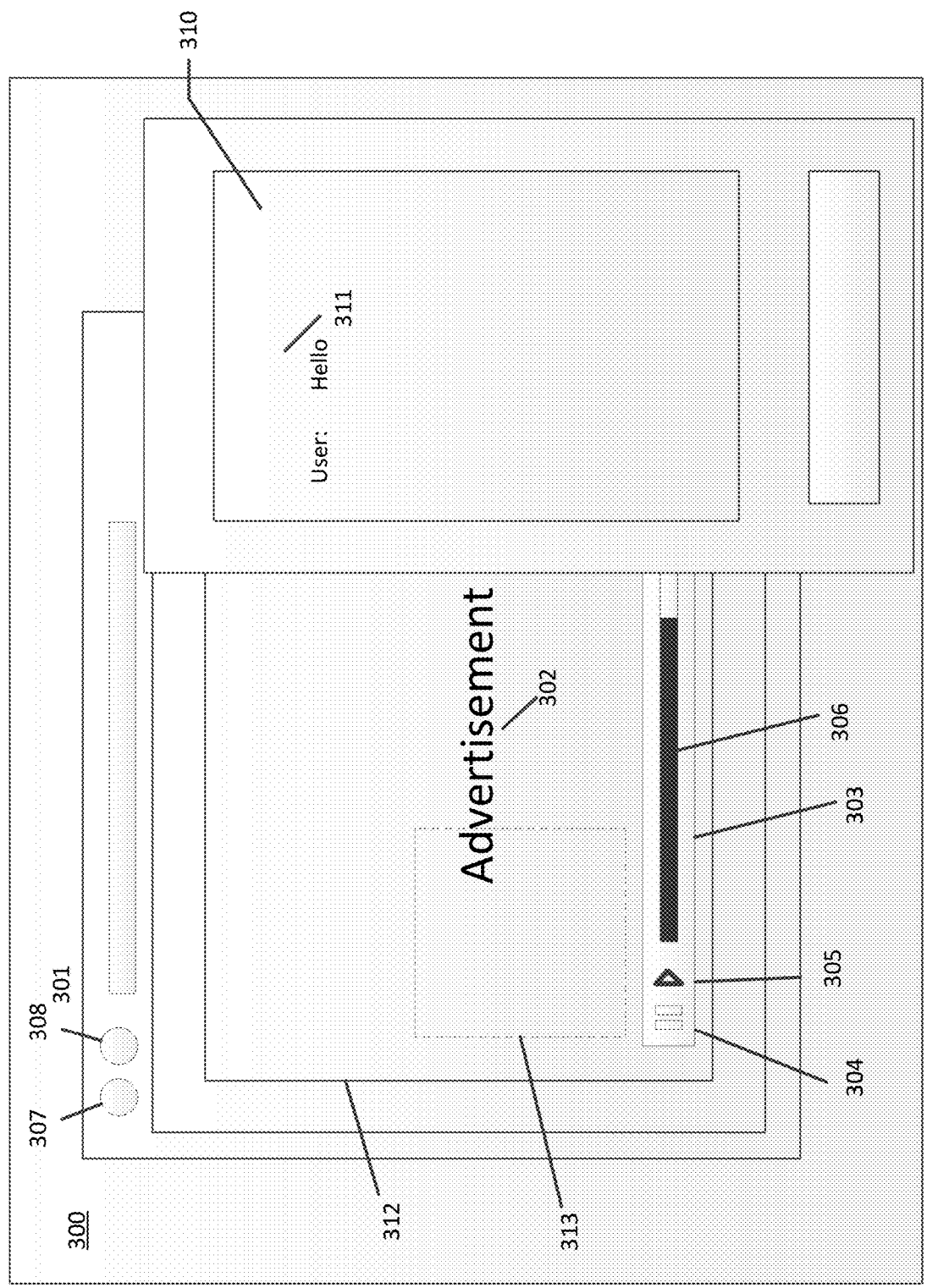
FIG. 3 illustrates a display area playing an advertisement, obscured by a window containing a chat program.
Figure 4:
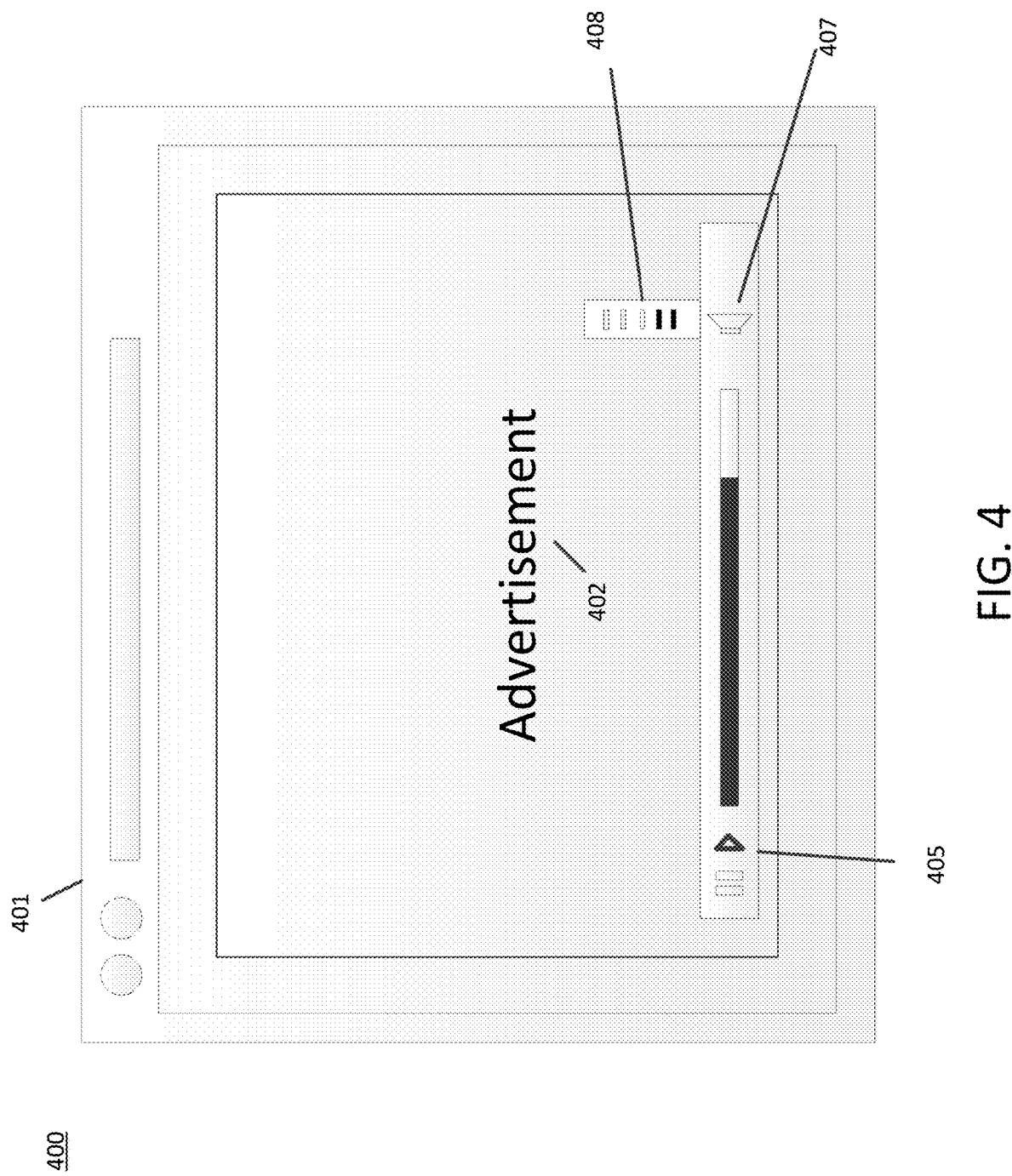
FIG. 4 illustrates a display area playing an advertisement, such that the audio level has been lessened.

FIGS. 3 and 4 illustrate different ways in which an advertisement may be impaired during the streaming of video content. In particular, FIG. 3 depicts a display 300, which may be a display screen on a computer monitor, tablet, television, smartphone, or other display device. In this example, a user may be using an Internet browser to view video content on a tablet computer. The browser may have a browser application display area 301 (e.g., a panel or window) through which the user peruses the available video offerings from a video Internet site, and upon selecting on offering, the user may view the requested video in the browser application's display area 301 as a video stream, and at times during the consumption of the video content, the browser application display area may display an advertisement 302. The browser application display area 301 may also include a control bar, 303. This bar, 303, includes, but is not limited to, a pause button, 304, a play button, 305, a progress bar, 306, and a sound control button (not shown). The browser contains icons for moving backward in browser history, 307, and moving forward in browser history, 308.

During display of the advertisement 302, the user may decide to open or switch to a different application. For example, the user may open an Internet chat application to exchange messages in a conversation with a friend, and the chat application's display area 310 may partially or totally obscure the browser application display area 301 and the advertisement 302. In this example, while the advertisement, 302, is playing during the streaming video content (as evidenced by the bolded play button, 305), the user has accessed another application 310, and in doing so has obscured some of the advertisement 302 appearing in the browser application display area 301. Although this example obstruction is due to another application on the device, an obstruction can also occur from within the same application (e.g., if the user were to open a menu in the browser application).

The obstruction also need not obscure the advertisement 302 to be an impediment to the advertisement's effectiveness. For example, if the user opened the chat application 310, and kept it on a different part of the display screen 300, without obscuring any portion of the browser application display area 301, the user's attention may still be diverted from the advertisement if the user were actively engaged in a chat during the advertisement's duration. For example, if the chat application 310 received the display device's user input focus (e.g., if the user actively typed on a keyboard, sending the keystrokes to the chat application), it may be evident that the user's attention was diverted from the advertisement. Similarly, if the z-order of the browser display area 301 was changed so that it was at a lower level in the order (lower being relative, in which higher z-order application display areas overlap lower z-order application display areas). Changes in the application display area's size may also indicate a diverting of attention (e.g., if the user were to shrink, or minimize, or hide, the browser application display area 301 during the advertisement 302). The user may also turn off the display function of the device, while leaving the browser application operational on the device.

The FIG. 3 examples discussed above illustrates examples of a visual obstruction of the advertisement 302. In some situations, the advertisement's audio may also be obscured by the user who, for example, may decide to turn down or mute the volume during the advertisement 302. FIG. 4 depicts impairment of an advertisement via the lessening of the audio level during play, 400. In that example, an advertisement, 402, is impaired such that the audio level has been lessened, as illustrated by the lessening of the bars in the audio level box, 408, above the sound control button, 407.

In both of these examples, the advertisement 302 was not given the user's full and undivided attention, and as a result, the advertisement 302 may have been less effective than expected. In embodiments herein, these impairments to the effectiveness of an advertisement may be tracked and reported to the advertiser, and in some embodiments, they impairments themselves may be restricted.

As discussed above, this kind of obstruction may be problematic for advertisers who pay to include their advertisements in video content. As such, although an advertisement, 302, plays during the video content, the user might not be watching the advertisement if he or she is accessing another window, 310, which obscures the advertisement. While an advertiser has paid a content server to stream its advertisement, that advertisement might not be viewed. Therefore, in this example, an advertiser may earn a refund credit for some or all of the funds paid for showing the advertisement depending on which parts of the advertisement were obscured and at what time.

An advertiser may decide that certain portions of the advertisement are more important than others for a user to consume (e.g., the upper-left corner, the central area, the audio, the first five seconds, the last five seconds, etc.), and thus may negotiate for partial refund credits depending on which parts of the advertisement were obscured. Similarly, an advertiser may decide that a particular percentage of advertisement obscured yields a partial or total refund credit. These systems of partial credits may create a weighing system so that certain portions of the video, both physically and temporally, may be of more or less value to an advertiser. For example, as in FIG. 3, an advertiser may decide that only the bottom left portion of the screen, portion 313, must be visible throughout the entirety of the advertisement, 302, in order to avoid a refund credit because that portion contains the advertiser's website. In this case, the advertiser has weighed portion 313 more heavily than the rest of the advertisement, and as such, would earn a refund credit if that portion were obscured. Alternatively, the advertiser may decide that in order to avoid a refund credit, portion 313 of the advertisement, 302 must be shown during the last five seconds of the advertisement, 302. In this case, a physical and temporal portion of the advertisement, 302, must be viewed in order for the advertiser to be satisfied that its advertisement, 302, was effective.

Apart from earning refund credits, an advertiser may wish to understand which portions of its advertisement, 302, are obscured in order to gauge user interest in portions of its advertisement, 302. The system herein may provide data as to which portions of an advertisement were viewed at what time so that it can develop more effective advertisements based on user viewing patterns. Compiling similar information from numerous users would allow for a determination of efficacy that has not been accessible previously. For example, if a user begins a chat program, which covers up most of the display area, but leaves exposed an animated area of the advertisement, portion 313, the advertiser may determine that this user, and perhaps others, would enjoy more animated sequences in advertisements. The advertiser may also determine that non-animated sequences are less effective. Similarly, the systems herein may report the audio obstructions to allow an advertiser to know whether sound from an advertisement had impact on a user. For example, if a user obscured an advertisement during the first few seconds of an advertisement but removed the obstruction upon the sound of puppies barking, an advertiser may decide that baby animals, or the sound of baby animals, may help improve user interest in advertisements.

Further, the system herein may identify which applications or windows were used to obscure the display area during the advertisement. For example, the system can note that the chat application obscured the advertisement, and that other applications on the user's device did not. In such a case, an advertiser may be able to determine what a user finds more interesting than an advertisement that is currently playing. This feedback could be useful to an advertiser in that it determines user interest in its advertisement compared to another program or window, and it also may assist in determining what users would prefer to see in advertisements.

Using FIG. 3, an advertiser may wish to know that a user accessed a chat program, 310, during the advertisement. In that case, an advertiser could determine that a user is more interested in chatting with friends than watching an advertisement. Such information could be helpful because an advertiser might create more advertisements showcasing social situations that cater more to people who chat frequently. Also, an advertiser may determine that an advertisement is more or less effective depending on what kind of application is obscuring the display area. For example, an advertiser may determine that a user accessing a chat program is less distracted from the advertisement than a user who accesses his or her email client during the advertisement. This might be because emails take more concentration to craft than chats with friends. This information further could aid an advertiser in determining other methods and avenues of advertising online. For example, an advertiser with such feedback may decide to create advertisements for chat programs or may create interactive advertisements with which several people chatting can interact.

In addition to the above examples, the system herein may report what a user inputs into an obscuring program or window and the timing of that input. As discussed above in the example, an advertiser may determine that a user is more or less distracted from an advertisement depending on the program used to obscure the advertisement. In FIG. 3, the user is using a chat program, 310, with which to chat with friends and has sent the message, "Hello," 311. An advertiser may be interested in what messages a user is sending to his or her friends during an advertisement. For example, an advertiser may determine that user chatting with a friend about a product showcased in an advertisement is less distracted overall than a user chatting about something irrelevant to the advertisement. Also, an advertiser may determine that though very little of the display area is obscured by another window, a user is more distracted from the advertisement if he or she is furiously typing to a friend throughout the entirety of the advertisement rather than typing slowly or pausing between messages. An advertiser may also test the efficacy of portions of an advertisement by determining at what time during an advertisement a user types to his or her friends in a chat window.

As discussed above, FIG. 4 illustrates a network browser, 401, which includes a display area, 412, playing an advertisement, 402, such that the audio level has been lessened during the advertisement from the level of the video content prior to the advertisement. In this example, while the advertisement, 402, is playing during the streaming video content (as evidenced by the bolded play button, 405), the user has selected the sound control button, 407, and lessened the number of bars in the audio level box, 408.

Similar to the issues involved in obstructing the display area, 412, an advertiser may wish to know at what time the audio level of its advertisement has been lessened. For example, an advertiser may negotiate with the content server to accept a refund credit or a partial refund credit if a user mutes the advertisement at any time. This reasoning may be due to the fact that an advertiser would find it unlikely that a user was effectively affected by the advertisement because he or she did not hear a portion of it. Similarly, an advertiser may wish to receive a partial refund credit if the user lessened the audio level during part of the advertisement. For example, the advertiser may receive a refund credit if the last five seconds of the advertisement, 402, were played at a lower audio level because the advertiser's name and product were explicitly stated during those seconds. An advertiser may also wish to receive refund credits based on the percentage decrease in audio level by the user. In this case, the advertiser may still receive refund credit without relying on the user to go to the extreme of muting the advertisement, 402.

Beyond earning credits, an advertiser may gather information as to the efficacy of its advertisement by observing how much the audio level is lessened or increased and at what time. For example, if a user mutes an advertisement during a song portion of the advertisement, an advertiser may decide that the song was ineffective. Also, if a user unmutes an advertisement upon observing an animation, the advertiser may decide that a user will likely wish to hear the accompanying sounds for an animation. Further, an advertiser may hypothesize that a user lessening the audio level of an advertisement without muting it is mildly interested in the product advertised, more so than a user who mutes the advertisement. The information gathered through these methods and those discussed in reference to FIG. 3 would be important to determine the efficacy of each advertisement.

Any of the methods mentioned above can be combined with one another to measure efficacy of an advertisement. For example, an advertiser may wish to determine at what times during an advertisement a user obstructs the display area of an advertisement and whether those times correspond to times during which a user may lessen the audio level of the advertisement. Measurements of this type may better determine user distraction from the advertisement during play.

Figure 5:
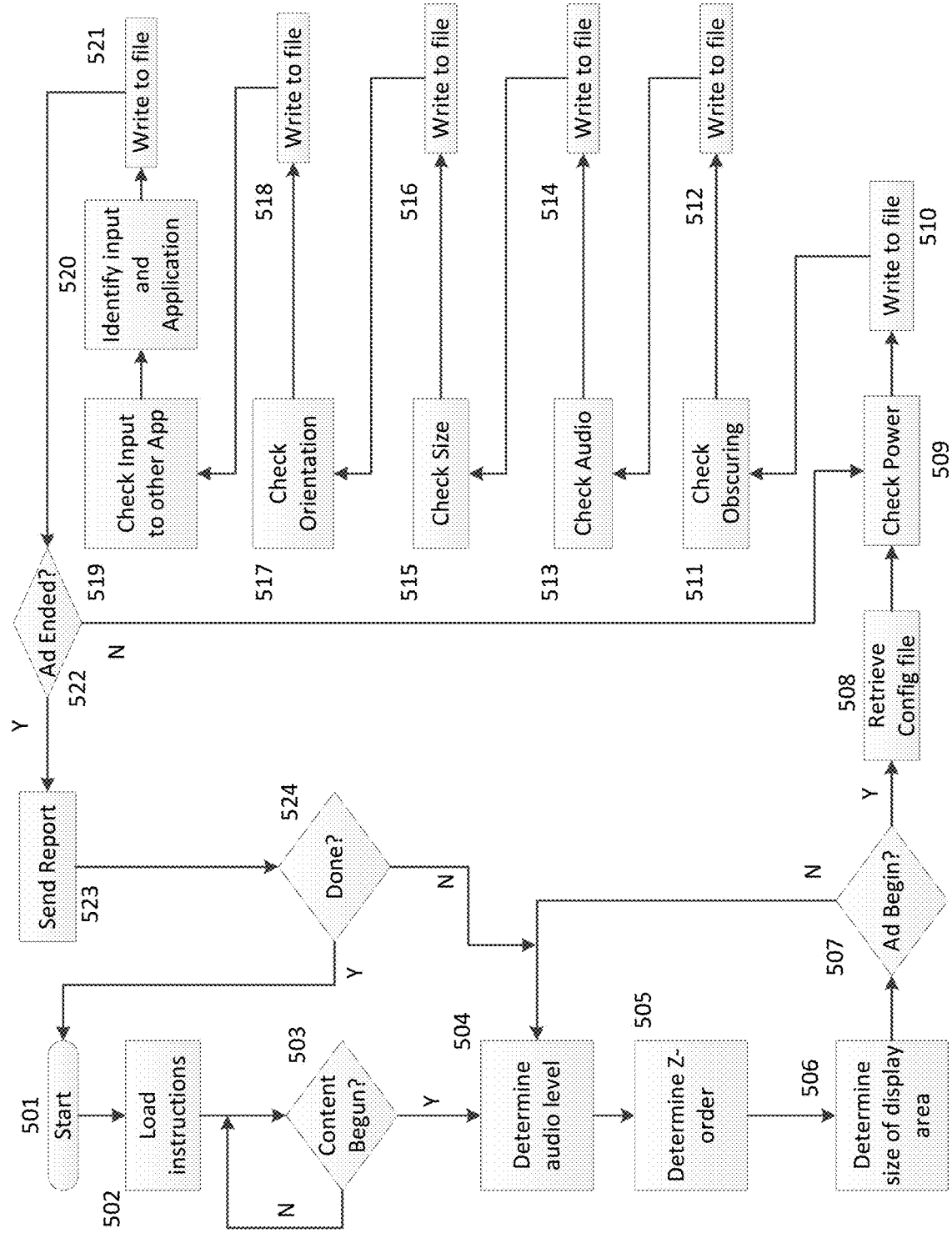
FIG. 5 is a flow diagram illustrating an example advertisement efficacy file report creation process, according to one or more aspects of the disclosure.

FIG. 5 illustrates an example process that a consumption device, such as a user's tablet computer, DVR, smartphone, personal computer, etc. may employ to monitor the efficacy of advertisements and send a report comprising the measurements of those parameters to the advertisement server. The example consumption device below is a display device, such as a personal computer or tablet. The FIG. 5 process may begin after the user has requested to begin consuming content, such as after the user has requested to begin watching an Internet video. Upon beginning the process, 501, the display device may load the requested video content (or the initial portion thereof), and may also load configuration instructions 502. The configuration instructions may be downloaded as part of a content download, and may contain various configuration settings and data for the content delivery. The configuration data may include information identifying a timeline for the content, and indicating what advertisements are scheduled to be presented, and at what playback times they are to be presented. The configuration information may also identify an address for one or more advertising servers, which may be servers 106 or 107, that are to receive reports of the user's advertisement consumption behavior. These instructions allow the device to determine which portions of the video content constitute advertisements, and may also allow the display device to determine the viewing parameters to monitor for the advertisement, such as the level of obstruction, audio level, z-order, etc.

Upon loading those instructions, the device must then determine if the video content has begun playing in the display area, 503. If the video content has not yet begun playing, the device will continue to check until the video content begins to play in the display area. Afterward, the device will determine baseline parameters in Steps 504, 505, and 506. These parameters comprise determining the audio level, 504, the z-order, 505, and the size of the application display area, 506.

In Step 507, the device determines whether the advertisement portion of the content presentation has begun. As noted above, this may be determined by checking the configuration information for the content. Alternatively, this may be determined by detecting an advertising marker in the streaming content. If it has not, the device recalculates the baseline parameters to ready itself for the playing of the advertisement. If the advertisement has begun, the device may retrieve the configuration file that it had previously loaded, 508. This configuration file comprises a set of instructions for the device to perform during the advertisement to create a report to send to the advertisement server upon completion of the advertisement. In alternative embodiments, the advertisement's configuration file may be downloaded at a different time, such as prior to the content beginning, or even after the advertisement begins.

In the embodiment of FIG. 5, the device tests for particular user-instigated changes that may occur during the advertisement. First, in Step 509, the device determines if the user has turned off the display device or monitor. Turning off the display device may indicate that the user did not observe the advertisement. In step 510, the device may then record information indicating whether the user turned the display, along with the time of determination in a report file that will be sent to the advertisement server.

In step 511, the device may determine whether the advertisement has been obscured in is presentation. As noted above, an advertisement may be obscured in many ways including, but not limited to, another application visually overlapping the advertisement, as illustrated in FIG. 3 and described above. To determine whether an advertisement is obscured, the device may examine its own graphics systems to determine what images are being displayed on the areas of the screen, and whether the application containing the advertisement has any of its display area obscured. If any of that application's display area is overlaid by another application or object, the device may identify the portions of the advertisement that are overlaid, and the item(s) and applications that are overlaying those portions. As with the previous steps, the information identifying the obstruction of the advertisement and the time of determination are saved in the report file in Step 512.

Next, in Step 513, the device determines if the audio level of the video content has changed during the advertisement. This determination may retrieve a current audio level, and compare it to the audio level determined in step 504 before the advertisement began. The device may store information identifying this change in audio (including whether muting was implemented) to the report file in step 514.

In step 515, device may then check to see if the size of the display area in which the advertisement is playing has changed from when it was determined in step 506. This may include determining the new size and/or placement on the screen (e.g., if the user repositioned the application's display area) of the application's display area, as well as whether the application display area was completely minimized from display. Information identifying these sizes and/or changes In step 516, the device may store this data in the report file.

In step 517, the device may determine whether its orientation or acceleration has changed during the advertisement in Step 517. This may be done, for example, by comparing its current orientation and/or acceleration data with previous orientation and/or acceleration data, which may have been obtained with step 506. The device may then write that data and the time of measurement to the report file in Step 518.

In step 519, the device may determine if the user is inputting information into another application on the device. This may be done, for example, by registering the device monitoring function with the device's user input capturing system, such as its keyboard, mouse, touch screen and microphone systems, and receiving reports of the inputs being provided by the user. In step 520, the device may also identify the application that is receiving the user inputs (e.g., identifying the chat application), as well as the input the user is entering. The device may then write that information to the file along with the time of determination in step 521.

After these measurements and any subsequent measurements are taken, the device may determine whether the advertisement has ended in step 522. The instructions as to the determination of whether the advertisement has ended may be found in the instructions loaded with the video content in step 502 (e.g., the configuration file may provide a time value for when the advertisement is over, or the device may examine an incoming stream for a marker identifying the end of the advertisement or the beginning of a different portion of the content). If the ad is not over, then the device may return to step 509, repeating the various measurements and data storage described above. Note that the comparisons with the initially determined levels, z-order, display, etc., may instead be made against the previously stored version, if desired.

If, in step 522, the device has determined that the advertisement has ended, then the report file may be sent to the advertisement server in step 523 for further processing, which can include examining the report to indicate how effective the advertisement was, and to determine whether the advertiser is entitled to any refund or credits. The advertisement server may also assemble data to send a report to the advertiser.

Once the report has been sent, the device may determine in step 524 whether the application has completed presenting the content to the user. This information may be contained in the instructions loaded in step 502 (e.g., as an expected duration), or the determination may simply be made by determining whether an end-of-content signal has been received, or if the content is no longer streaming. If the content presentation is not complete, then the device may return to step 504. If the content presentation is complete, then the process may return to the state prior to step 501, and await the next time the user requests content.

Note that FIG. 5 is merely an example. The steps of FIG. 5 may be added, removed, combined, divided, or rearranged to fit the needs of an advertiser or display device. The same is true for the other examples and processes described herein.

Figure 6:
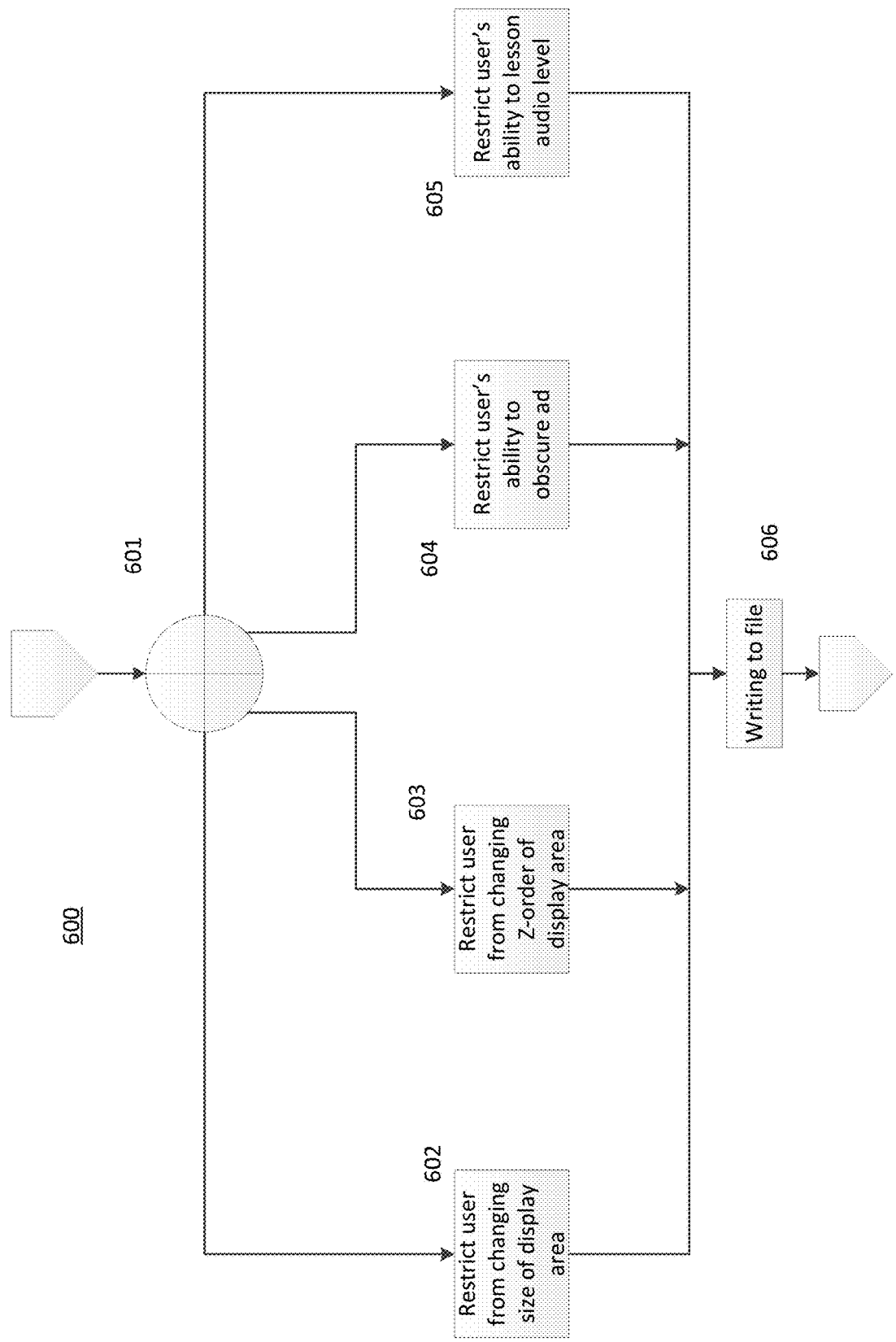
FIG. 6 is a flow diagram illustrating an example process of user restriction during an advertisement, according to one or more aspects of the disclosure.
Figure 7:
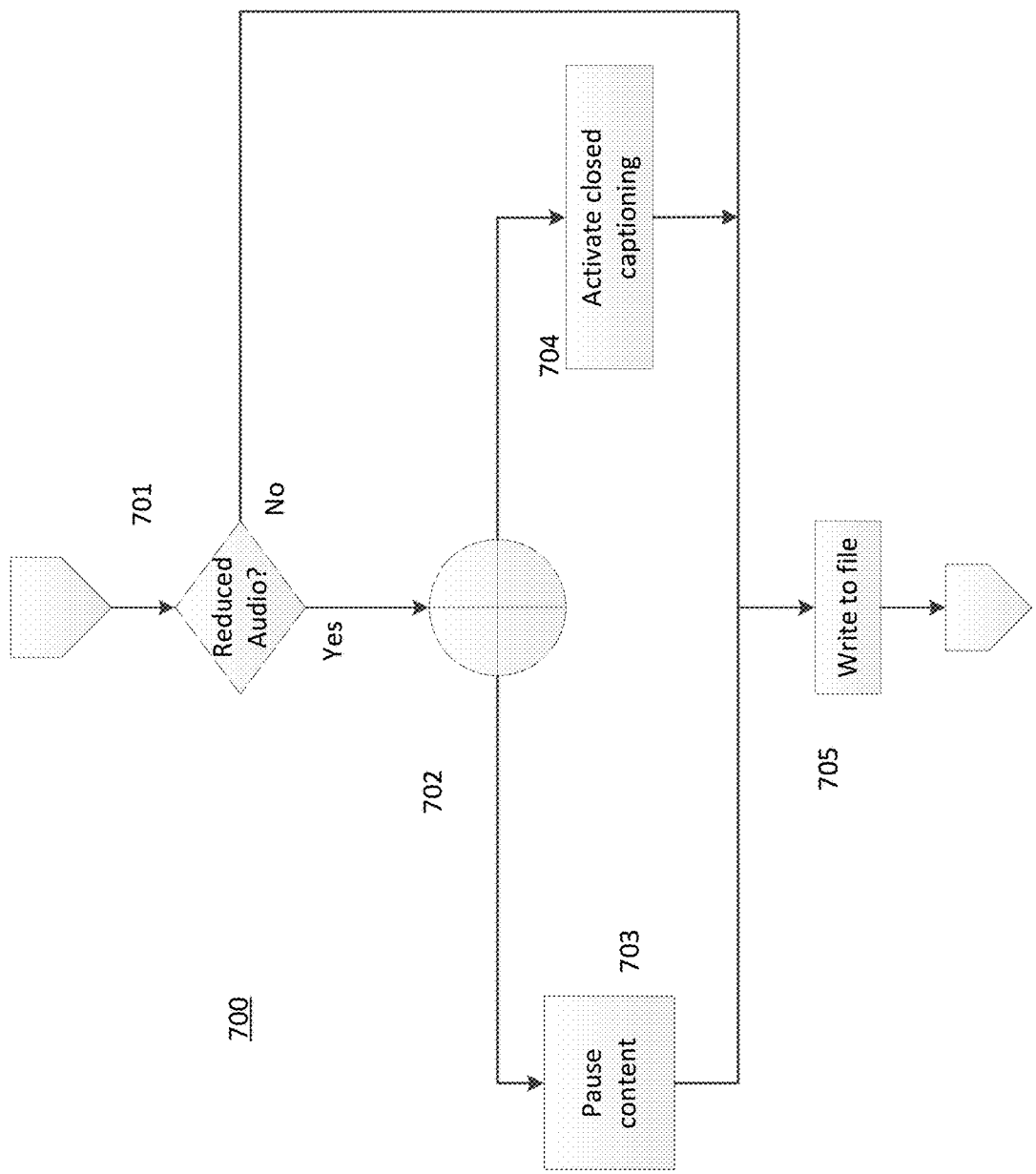
FIG. 7 is a flow diagram illustrating actions of the display device in response to user action during an advertisement, according to one or more aspects of the disclosure.

The FIG. 5 example was a passive example, in which the consumption device simply monitored the user's behavior, and reported it. In other embodiments, the consumption device may take a more active role regarding the user's ad consumption behavior and options. FIGS. 6 and 7 illustrate embodiments in which the display device plays an active role in regulating a user's experience of an advertisement. FIG. 6 involves an embodiment wherein the display device restricts a user's ability to obstruct an advertisement or lessen its audio level, 600. FIG. 7 involves an embodiment wherein the device allows a user to make changes to the audio level, but then either pauses video content or activates closed captioning, 700.

FIG. 6 involves an embodiment of the method illustrated in FIG. 5 wherein the display device restricts a user's actions during an advertisement, 600. The method of FIG. 6 can be inserted anywhere applicable in FIG. 5 and may replace any applicable steps of FIG. 5. For example, the method of FIG. 6 may replace steps 509-521 of FIG. 5. In Step 601, the display device may choose any or all of the possible restrictions on user behavior in the configuration file loaded in Step 508, and may apply the restrictions throughout the duration of the advertisement, or at specific portions of the advertisement as indicated in the configuration data. For example, the advertiser may indicate in the configuration file that some restrictions should be applied only to the first ten seconds of the advertisement, while other restrictions should be applied only to the upper-left corner of the display area.

The display device may restrict the user's ability to change the size of the display area in step 602. The restrictions may include a total prohibition on changing the display size, which would prevent the user from being able to reduce or minimize the size of the application display area during the presentation of the advertisement. The restrictions may also, or alternatively, place a minimum and/or maximum size for the application display area. The user may be permitted to resize the display area to some degree, but not smaller than the minimum, or larger than the maximum. In some embodiments, the resizing limitations may also identify whether the entire advertisement screen is to scale equally when the size is changed, or if a zooming effect is permitted, and if zooming is permitted, then the limitations may indicate a point in the advertisement that will be the central point of the zooming. So, for example, a user may be permitted to reduce the size of the advertisement, but in doing so the display will center and focus on the identified zooming central point (e.g., the central point of the ad, or an upper-left quadrant). This control over the size of the display area allows for the advertiser to ensure that particular portions of its advertisement are visible during play. These restrictions may also be temporal. The limitations may identify one or more time segments of the advertisement (e.g., the first five seconds) during which resizing limitations are to be enforced.

In step 603, the device may restrict the user from changing the z-order of the display area playing the advertisement.

For example, the device may restrict the user from lowering the display area's z-order by more than two units, or it may require that the advertisement display be given the topmost level in the z-order, so that it is always on top in the layered display. Alternatively, the device may prohibit changes in z-order, keeping the application at whatever level it was at for the presentation of the non-advertising content. As with the previous step, these restrictions may vary with temporal portions of the advertisement.

In step 604, the device may restrict the user's ability to obstruct the advertisement. Obstruction of the advertisement may include any or all of the methods discussed with regard to FIG. 3. The restrictions may prohibit certain types of overlapping, in addition to (or aside from) the z-order restriction keeping the advertisement on top. For example, the restrictions may identify a portion of the advertisement (e.g., the upper-left corner, or the last five seconds) that cannot be overlaid by other application displays. The user may be permitted to move another display on top of the advertisement, but the identified portion of the advertisement would remain visible. Enforcement may include stopping the movement of another application's display window at the identified portion of the advertisement, or allowing movement of the other application's display to overlap the advertisement's display area (but the advertisement's identified portion would retain the top z-order level and be visible, even if the other application's content is otherwise visible). As in step 604, the device may restrict obstruction of the advertisement at any temporal or physical portion of the advertisement. For example, the device may restrict obstruction of the advertisement during the last five seconds because the advertiser's name and product are prominently presented.

The restrictions on obscuring may also depend on the obscuring application. For example, the advertiser may permit certain applications to overlay their advertisements, and prohibit others from doing so. As an example, an advertiser may wish to encourage its viewers to access an Internet page for an advertised product. If the user, while viewing the ad, decides to open a second browser application to the advertiser's Internet site (which may be specified in the configuration data for the advertisement), then the user may be permitted to move that browser's display area or window to overlap with the advertisement, and the advertisement may allow the browser's content to obscure the advertisement. In some embodiments, upon conclusion of the advertisement, or if the user navigates the overlapping browser to a different web page that is not identified in the advertisement's configuration data, the advertisement may resume the top z-order display, and move to appear atop the browser.

In step 605, the device restricts the user from lessening the audio level during an advertisement. In that step, the device may only allow a user to lessen the volume by two bars in the audio level box, or may only prohibit muting of the advertisement (and at which time a close-captioned display may automatically appear atop the advertisement in response to the muting and without requiring the user to supply an additional command for closed-captioning).

Following these steps, the device may then write information collected during restriction to the report file to be sent to the advertisement server in step 606. In this embodiment, the method would continue with step 522 of FIG. 5. In the process above, the restrictions may be lifted in exchange for actions by the user. For example, a user who attempts to minimize an advertisement may be presented with a pop-up message, providing an option to allow the minimization if the user agrees to have a corresponding advertisement emailed to the user's email address (which may have been provided as part of an initial registration for service).

In FIG. 7, rather than restrict user action, the device implements responses to the user actions, 700. As with the method of FIG. 6, the steps of FIG. 7 may be added to the embodiment of FIG. 5 or may replace certain steps of FIG. 7. For example, the steps of FIG. 7 may replace Steps 513 and 514 of FIG. 5. In Step 701, the display device determines whether the user has lessened the audio level. If not, the method will continue to step 705 during which the device will write that information as well as the time of determination to the report file. If the device determines that the user has lessened the audio level, the device may proceed to step 702 and perform either Step 703, 704, or both. In Step 703, the device may pause video content upon lessening of audio level. In some embodiments, the device may resume playing the content (e.g., the advertisement, although this may be applied to the other content as well) in response to the user raising the audio level above a predetermined point, or returning the audio to the original level before the user turned it down. In others, the device may resume play if the user presses play, without requiring an audio level change again. In step 704, the device activates closed captioning upon lessening of the audio level during an advertisement. Closed captioning might remain for the entirety of the video content. Alternatively, the device might cease closed captioning upon completion of the advertisement or if and when the user raises the audio level. In some embodiments, steps 703 or 704 may only be activated if the audio level is lessened by more than a particular amount or percentage. In other embodiments, those steps may only be activated upon muting the advertisement. Following steps 703 or 704, the device may write the information and time of determinations to the report file to be sent to the advertisement server.

Figure 8:
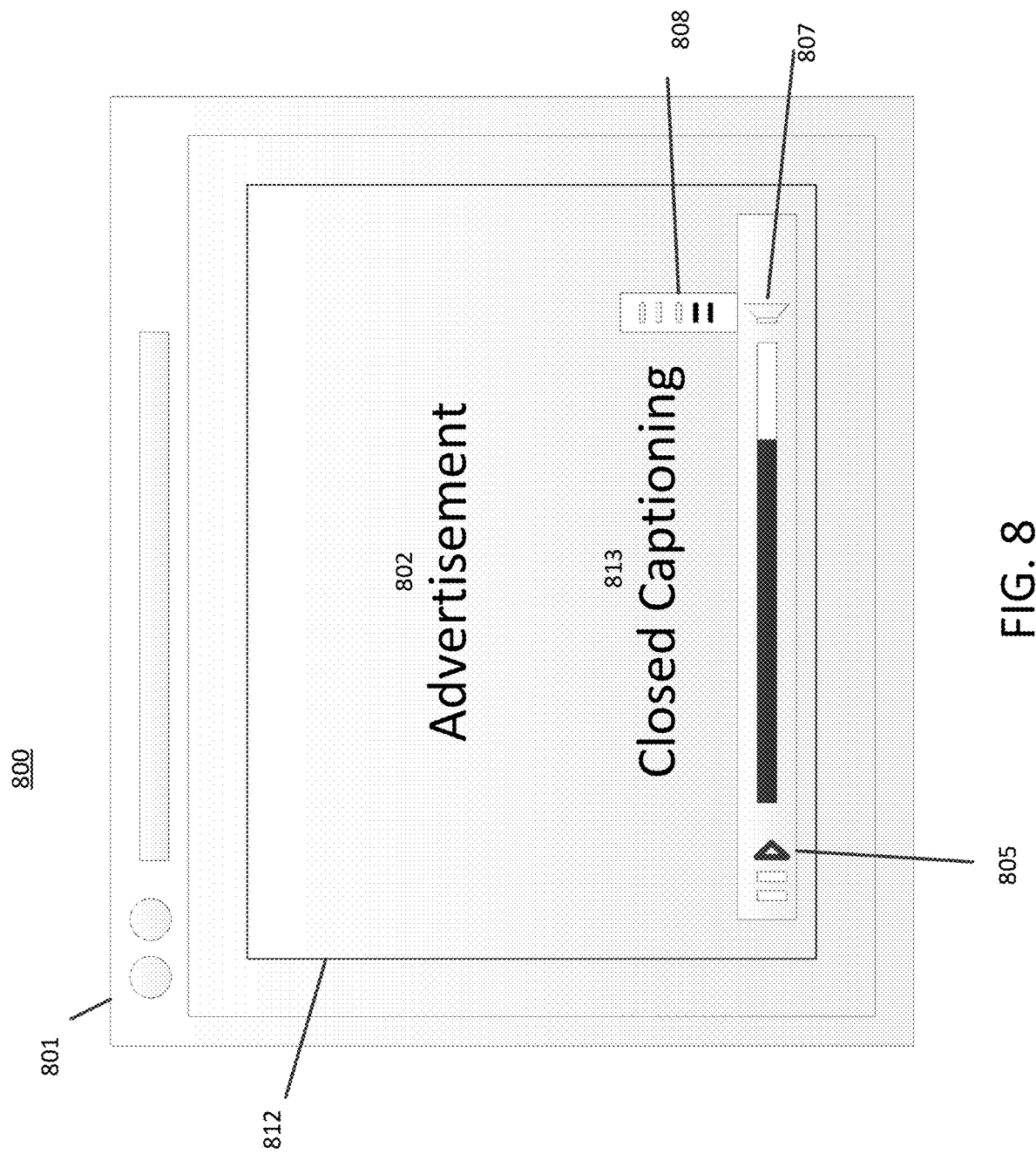
FIG. 8 illustrates a display area playing an advertisement, such that the audio level has been lessened, and in response, the device activates closed captioning.
Figure 9:
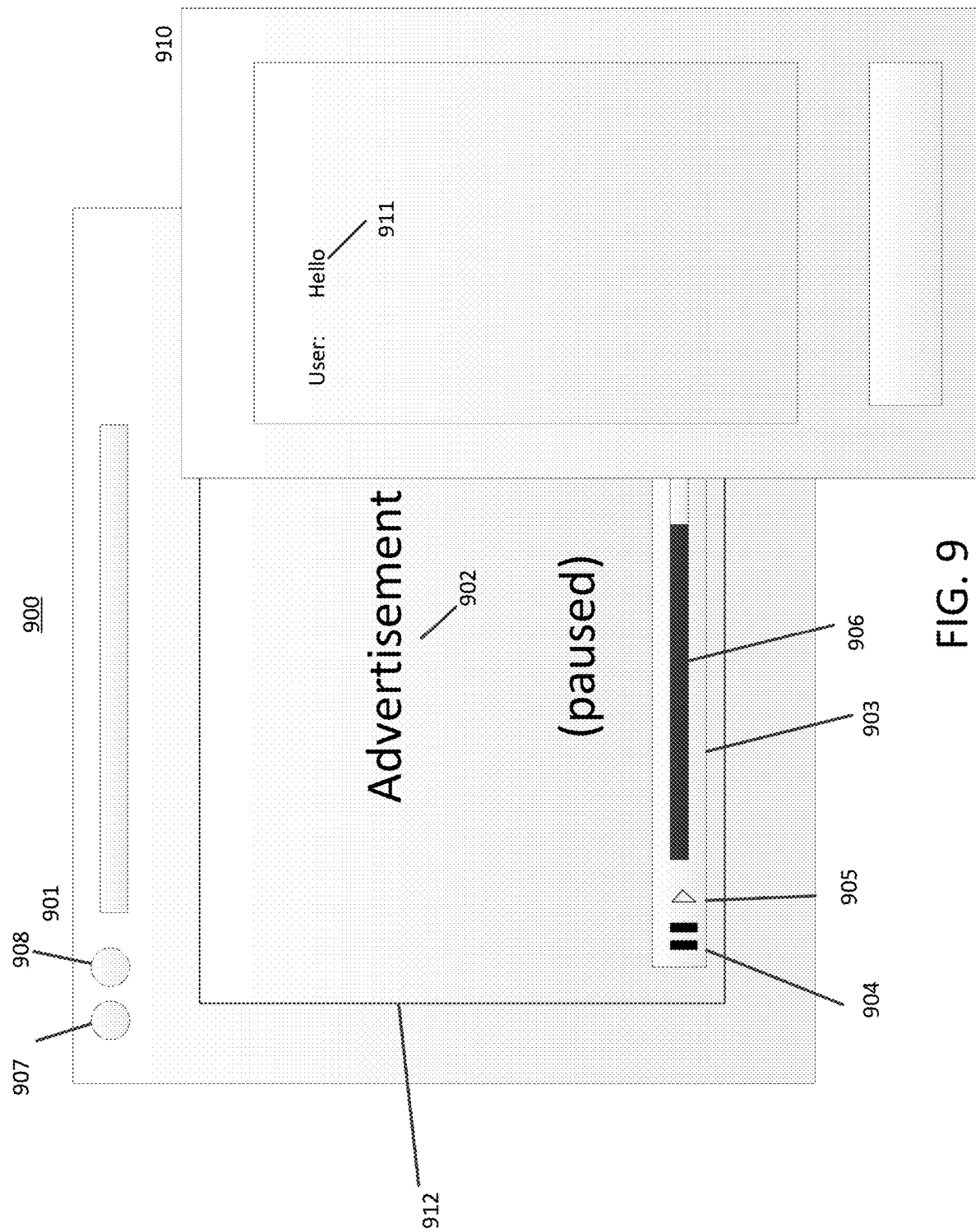
FIG. 9 illustrates a display area playing an advertisement, obscured by a window containing a chat program, and in response, the device pauses the video content.

FIGS. 8 and 9 illustrate additional embodiments of active methods in which a device can respond to a user's actions during an advertisement. FIG. 8, like FIG. 4, illustrates a network browser, 801, which includes a display area, 812, playing an advertisement, 802, such that the audio level has been lessened during the advertisement from the level of the video content prior to the advertisement, 800. In this example, while the advertisement, 802, is playing during the streaming video content (as evidenced by the bolded play button, 805), the user has selected the sound control button, 807, and lessened the number of bars in the audio level box, 808. In response to this lessening of audio level, the device has activated closed captioning, 813, during the advertisement, 802. As discussed above, the closed captioning, 813, may last only for the duration of the advertisement, 802, or may disappear once non-advertisement content starts to play.

FIG. 9 illustrates an advertisement obstructed by another application, 900. In this example, the advertisement, 902, is played on a network browser, 901, inside a display area, 912, in the browser. The browser contains icons for moving backward in browser history, 907, and moving forward in browser history, 908. The streaming video content, including the advertisement, 902, contains a control bar, 903. This bar, 903, includes, but is not limited to, a pause button, 904, a play button, 905, a progress bar, 906, and a sound control button (not shown). In this example, while the advertisement, 902, is playing during the streaming video content the user has accessed another application 910, and in doing so has obscured some of the display area, 912, of the advertisement. In response to this obstruction, the device has paused the advertisement, 902 (as evidenced by the bolded pause button, 904). The device may unpause the content if the user removes the obstructing window, or the device may unpause if the user manually unpauses the content, among other possible methods.

The Steps discussed above may be added, removed or changed in any way that satisfies the parameters of the advertisement server or display device.

FIGS. 10a and 10b illustrate two different ways in which the configuration file of step 508 of FIG. 5 may manifest. FIG. 10a embodies a pseudo-code manifestation of such a configuration file. FIG. 10b embodies a table version of such a configuration file.

In FIG. 10a, the configuration file constitutes a function that runs during the length of the advertisement. First, the variable "content" may be the number of seconds of content that have played at the current time. Then the variable, "audio_level" may be the audio level of the content one second before the start of the advertisement. The variable "obscurity" may be the level of obscurity of the display showing the advertisement, one second before the advertisement begins. The variable "z-order" may be the z-order of the display area one second before the advertisement begins. The variable "ad_content" is defined as the number of seconds in the advertisement.

A void function "configuration" is then created. This function operates a for loop dependent on the variable x. The loop runs from the start of the advertisement, x=0, to the end of the advertisement, x=ad_content. During the loop, for each second, x, the function creates variables associated with measurements taken during the advertisement. The function creates a variable "ad_audio_level" which may be the audio level of the advertisement at second x. The function creates the variable "ad_obscurity" which may be the level of obscurity of the display area during second x of the advertisement. The function also creates the variable "ad_z-order" which determines the z-order of the display area playing the advertisement at second x.

Once those variables are set, the function determines whether ad_audio_level is less than audio_level. If so, the function prints, "User lessened volume at" x "seconds into the ad." The function then determines if ad_obscurity is greater than obscurity. If so, the function prints, "User obscured as at" x "seconds into the ad." Finally, the function determines if ad_z-order is less than z-order. If so, the function prints, "User was engaged in a different window at" x "seconds into the ad". This loop repeats for every second of the advertisement.

FIG. 10b constitutes a simple table version of the configuration file. The table simply requires the device to report a lessening of audio level, an obstruction of the advertisement, or a change in z-order of the advertisement and the time at which these actions occurred. While FIGS. 10a and 10b represent possible configuration files, they are simplistic. Most configuration files produced with respect to this patent will likely be more complex.

Figure 11:
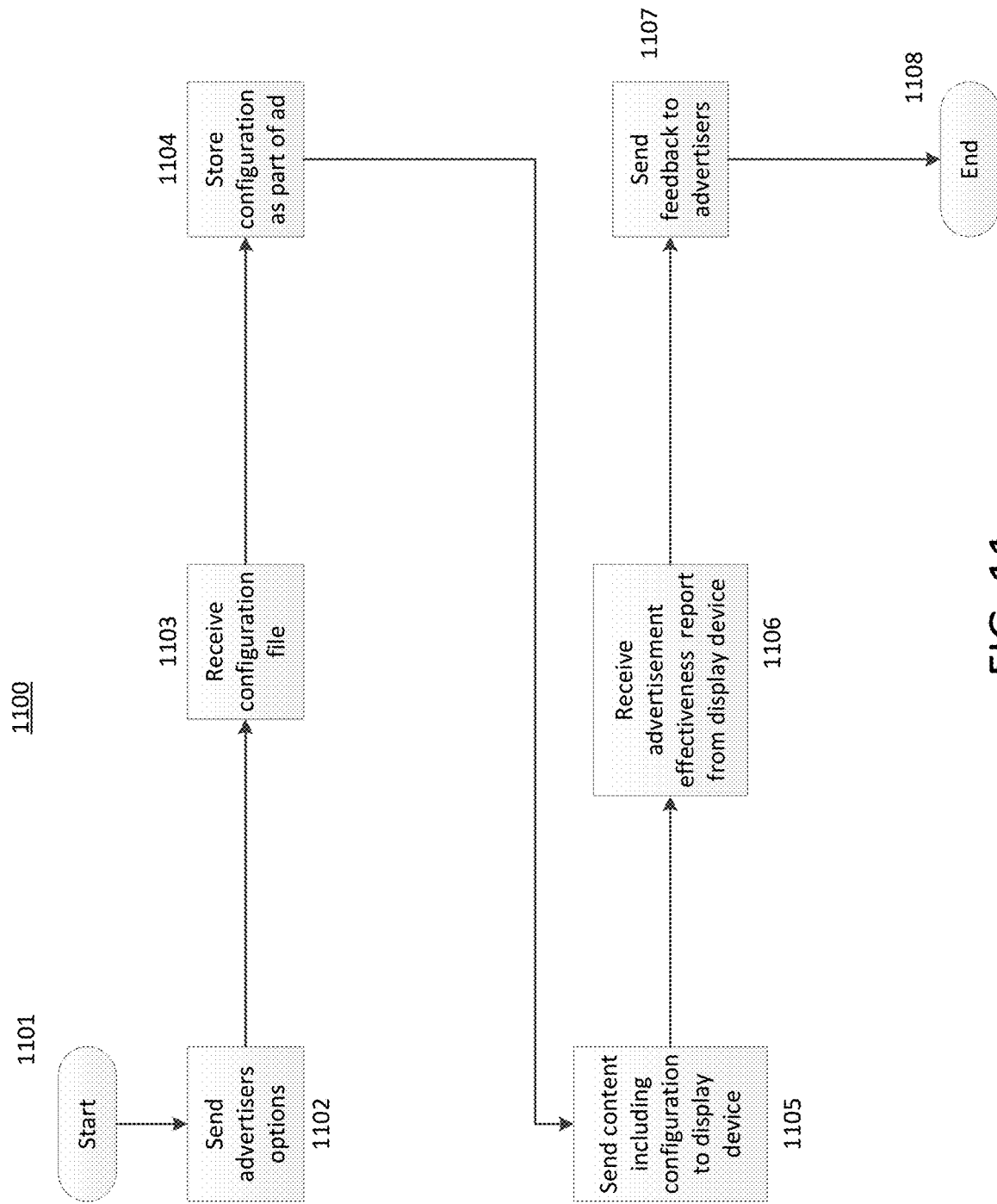
FIG. 11 is a flow diagram illustrating actions of the advertisement server, according to one or more aspects of the disclosure.

FIG. 11 illustrates an embodiment of the actions of the advertisement server with respect to the display device's actions, 1100. Upon the start of the method, 1101, the advertisement server may send advertisers options as to what parameters or measurements they can require a display device to monitor, 1102. These parameters or measurements may encompass any of the steps discussed in reference to the previous Figures. The server would then receive a configuration file from the advertisers which includes those parameters or measurements, 1103. After that step, the server would likely store the configuration as part of the advertisement it sends to the display device so that the device can activate it upon receipt of the advertisement, 1104. After the server sends the content to the display device, Step 1105, the server then awaits receipt of the advertisement effectiveness report file that the display device develops after each advertisement played, 1106. The server then sends the feedback to advertisers so that the efficacy of advertisements can be studied by those advertisers, 1107, before the method ends, 1108.

The FIG. 3 example illustrates one manner in which an advertisement may be obscured on a device, such as a personal computer or tablet, that is able to support multiple simultaneous applications. However, as also noted above, secondary applications are not the only way in which an advertisement may be obscured in its presentation. In some alternate embodiments, the features described herein may be used for a DVR's or set-top box's presentation of audiovisual advertising content, such as that received in a broadcast or multicast transmission of a video program (e.g., the nightly news, a movie, etc.). In such embodiments, the DVR or set-top box (STB) may receive an incoming datastream carrying the video program that the user wishes to view, and decode the datastream to present the video program on an associated display device, such as a television or video monitor.

In such embodiments, the video stream carrying the video (e.g., an MPEG-2 transport stream) may also carry tags or codes (e.g., a unique advertisement identifier) that may be inserted in the stream to indicate when commercials interrupt a video program, and when the video program content begins or resumes. The DVR or STB may be configured to respond to a commercial tag by monitoring the user's use of the DVR or STB during the commercial's duration. As one example, the DVR or STB may determine whether the user changed channels during the presentation of the commercial. As another example, the DVR or STB may determine whether the user turned off the television, but not the DVR or STB, during the commercial (e.g., this may be accomplished, for example, by exchanging messages between the DVR or STB and the television, such as using High Definition Multimedia Interface (HDMI) signaling to indicate the powering off of the television).

In some embodiments, the user may have multiple video sources connected to the same video display device. For example, the user may have a video game console and a DVR connected to a television, and during a commercial break the user may decide to stop watching the DVR program and start playing a video game. When the user switches the input source on the television, the television may be configured to report that change to the DVR (e.g., via the same HDMI signaling, or via a different protocol), and the DVR may note that the commercial on the video stream is not actually being viewed.

The tags or codes may be recorded as part of a DVR recording of the video program, and in that way, when the user plays back the recording, the DVR may once again detect the codes and track the commercial views. This feature can also be used when a viewer pauses and rewinds a linear television stream (e.g., a live broadcast of a football game) to watch a commercial again—the user's DVR can track the repeated viewings of the same commercial.

In some embodiments, the DVR may offer multiple tuners to the user, where each tuner is able to receive and decode a single stream for presentation to the user. These tuners can allow the user to watch one program and record one or more others (depending on the number of tuners available). When a user is viewing a first program using a first tuner, and a commercial begins, the user might switch to a different tuner to watch a different program and avoid the commercial. In some embodiments herein, the DVR may track the user's switching of tuners, and may store information indicating that the user did not actually view a commercial that was received by the first tuner but not fully viewed by the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
causing, by a computing device, output of an advertisement;
determining that a content item obscures at least a portion of the advertisement being output via a display; and
based on the portion of the advertisement being a certain portion of the advertisement that is restricted from being obscured, pausing the advertisement being output via the display.

2. The method of claim 1, wherein the portion of the advertisement is at least one of:
a spatial portion of the advertisement; or
a temporal portion of the advertisement.

3. The method of claim 1, further comprising:
restricting, based on the determining, user access to a control of the display.

4. The method of claim 1, wherein the determining comprises receiving a user input via an application window different from the advertisement.

5. The method of claim 1, wherein:
the advertisement is associated with an indication of one or more webpages that are permitted to obscure the advertisement without pausing the advertisement; and
the content item is a webpage different from the one or more webpages.

6. The method of claim 1, further comprising unpausing the advertisement based on determining that the content item no longer obscures the portion of the advertisement.

7. The method of claim 1, wherein both the advertisement and the content item are simultaneously presented via the display when the content item obscures the portion of the advertisement.

8. The method of claim 1, further comprising:
determining, after the pausing, that the content item obscures only a second portion of the advertisement, wherein obscuring of the second portion is permitted; and
unpausing, based on determining that the content item obscures only the second portion of the advertisement, the advertisement.

9. The method of claim 1, wherein the determining that the content item obscures the portion of the advertisement comprises determining that the content item reduces an audio level of the advertisement.

10. The method of claim 1, further comprising receiving, during the output of the advertisement, information restricting obscuring of the portion of the advertisement and permitting obscuring of a second portion of the advertisement.

11. A method comprising:
causing, by a first computing device, output of an advertisement;
determining that a content item obscures at least a first portion of the advertisement being output via a display;
generating, based on configuration information restricting obscuring of the first portion of the advertisement and permitting obscuring of a second portion of the advertisement, an indication of effectiveness of the advertisement; and
sending, to a second computing device, the indication of effectiveness of the advertisement.

12. The method of claim 11, wherein the indication of effectiveness of the advertisement comprises:
an indication of an event that caused the first portion of the advertisement to be obscured; and
an indication of a time at which the event that caused the first portion of the advertisement to be obscured occurred.

13. The method of claim 11, wherein the configuration information identifies one or more additional computing devices configured to receive indications of effectiveness of the advertisement, and wherein sending the indication of effectiveness of the advertisement comprises sending the indication of effectiveness of the advertisement to the one or more additional computing devices.

14. The method of claim 11, further comprising:
restricting, based on the determining, user access to a control of the display.

15. The method of claim 11, further comprising:
receiving, based on sending the indication of effectiveness of the advertisement, updated configuration information restricting obscuring of one or more portions of one or more additional advertisements; and
causing, by the first computing device, output of a second advertisement of the one or more additional advertisements.

16. The method of claim 11, further comprising:
sending, to the second computing device and based on the indication of effectiveness of the advertisement, a credit for the second computing device.

17. The method of claim 11, wherein:
the advertisement is associated with an indication of one or more webpages that are permitted to obscure the advertisement without pausing the advertisement; and
the content item is a webpage different from the one or more webpages.

18. The method of claim 11, wherein the advertisement is associated with an indication of one or more webpages that are permitted to obscure the advertisement, and wherein the indication of effectiveness of the advertisement comprises an indication that the advertisement was obscured by a webpage of the one or more webpages that are permitted to obscure the advertisement.

19. The method of claim 11, further comprising:
activating, based on the configuration information, closed captioning associated with the advertisement.

20. An apparatus comprising:
one or more processors; and
memory storing instructions that, when executed by the one or more processors, configure the apparatus to:
cause output of an advertisement;
determine that a content item obscures at least a portion of the advertisement being output via a display; and
based on the portion of the advertisement being a certain portion of the advertisement that is restricted from being obscured, pause the advertisement being output via the display.

21. The apparatus of claim 20, wherein the portion of the advertisement is at least one of:
a spatial portion of the advertisement; or
a temporal portion of the advertisement.

22. The apparatus of claim 20, wherein the instructions, when executed by the one or more processors, further configure the apparatus to:
restrict, based on the determining, user access to a control of the display.

23. The apparatus of claim 20, wherein the instructions, when executed by the one or more processors, configure the apparatus to determine that the content item obscures the portion of the advertisement by receiving a user input via an application window different from the advertisement.

24. The apparatus of claim 20, wherein:
the advertisement is associated with an indication of one or more webpages that are permitted to obscure the advertisement without pausing the advertisement; and
the content item is a webpage different from the one or more webpages.

25. The apparatus of claim 20, wherein the instructions, when executed by the one or more processors, further configure the apparatus to:
unpause the advertisement based on determining that the content item no longer obscures the portion of the advertisement.

26. The apparatus of claim 20, wherein both the advertisement and the content item are simultaneously presented via the display when the content item obscures the portion of the advertisement.

27. An apparatus comprising:
one or more processors; and
memory storing instructions that, when executed by the one or more processors, configure the apparatus to:
cause output of an advertisement;
determine that a content item obscures at least a first portion of the advertisement being output via a display;
generate, based on configuration information restricting obscuring of the first portion of the advertisement and permitting obscuring of a second portion of the advertisement, an indication of effectiveness of the advertisement; and
send, to a computing device, the indication of effectiveness of the advertisement.

28. The apparatus of claim 27, wherein the indication of effectiveness of the advertisement comprises:
an indication of an event that caused the first portion of the advertisement to be obscured; and
an indication of a time at which the event that caused the first portion of the advertisement to be obscured occurred.

29. The apparatus of claim 27, wherein the configuration information identifies one or more additional computing devices configured to receive indications of effectiveness of the advertisement, and wherein sending the indication of effectiveness of the advertisement comprises sending the indication of effectiveness of the advertisement to the one or more additional computing devices.

30. The apparatus of claim 27, wherein the instructions, when executed by the one or more processors, further configure the apparatus to:
restrict, based on the determining, user access to a control of the display.

31. The apparatus of claim 27, wherein the instructions, when executed by the one or more processors, further configure the apparatus to:
receive, based on sending the indication of effectiveness of the advertisement, updated configuration information restricting obscuring of one or more portions of one or more additional advertisements; and
cause output of a second advertisement of the one or more additional advertisements.

32. The apparatus of claim 27, wherein the instructions, when executed by the one or more processors, further configure the apparatus to:
send, to the computing device and based on the indication of effectiveness of the advertisement, a credit for the computing device.

33. The apparatus of claim 27, wherein:
the advertisement is associated with an indication of one or more webpages that are permitted to obscure the advertisement without pausing the advertisement; and
the content item is a webpage different from the one or more webpages.

34. The apparatus of claim 27, wherein the advertisement is associated with an indication of one or more webpages that are permitted to obscure the advertisement, and wherein the indication of effectiveness of the advertisement comprises an indication that the advertisement was obscured by a webpage of the one or more webpages that are permitted to obscure the advertisement.

35. The apparatus of claim 27, wherein the instructions, when executed by the one or more processors, further configure the apparatus to:
activate, based on the configuration information, closed captioning associated with the advertisement.

36. A system comprising:
a first computing device; and
a second computing device comprising:
one or more first processors; and
first memory storing first instructions that, when executed by the one or more first processors, cause the second computing device to send, to the computing device, an advertisement for output;
wherein the first computing device comprises:
one or more second processors; and
second memory storing second instructions that, when executed by the one or more second processors, cause the first computing device to:
cause output of the advertisement;
determine that a content item obscures at least a portion of the advertisement being output via a display; and
based on the portion of the advertisement being a certain portion of the advertisement that is restricted from being obscured, pause the advertisement being output via the display.

37. The system of claim 36, wherein the portion of the advertisement is at least one of:
a spatial portion of the advertisement; or
a temporal portion of the advertisement.

38. The system of claim 36, wherein the second instructions, when executed by the one or more second processors, cause the first computing device to:
restrict, based on the determining, user access to a control of the display.

39. The system of claim 36, wherein the second instructions, when executed by the one or more second processors, configure the first computing device to determine that the content item obscures the portion of the advertisement by receiving a user input via an application window different from the advertisement.

40. The system of claim 36, wherein:
the advertisement is associated with an indication of one or more webpages that are permitted to obscure the advertisement without pausing the advertisement; and
the content item is a webpage different from the one or more webpages.

41. The system of claim 36, wherein the second instructions, when executed by the one or more second processors, cause the first computing device to:
unpause the advertisement based on determining that the content item no longer obscures the portion of the advertisement.

42. The system of claim 36, wherein both the advertisement and the content item are simultaneously presented via the display when the content item obscures the portion of the advertisement.

43. A system comprising:
a first computing device comprising:
one or more first processors; and
first memory storing first instructions that, when executed by the one or more first processors, cause the first computing device to send, to a third computing device, an advertisement for output;
a second computing device comprising:
one or more second processors; and
second memory storing second instructions that, when executed by the one or more second processors, cause the second computing device to receive, from the third computing device, an indication of effectiveness of the advertisement; and
the third computing device, wherein the third computing device comprises:
one or more third processors; and
third memory storing third instructions that, when executed by the one or more third processors, cause the third computing device to:
cause output of the advertisement;
determine that a content item obscures at least a first portion of the advertisement being output via a display;
generate, based on configuration information restricting obscuring of the first portion of the advertisement and permitting obscuring of a second portion of the advertisement, the indication of effectiveness of the advertisement for the advertisement; and
send, to the second computing device, the indication of effectiveness of the advertisement.

44. The system of claim 43, wherein the indication of effectiveness of the advertisement comprises:
an indication of an event that caused the first portion of the advertisement to be obscured; and
an indication of a time at which the event that caused the first portion of the advertisement to be obscured occurred.

45. The system of claim 43, wherein the configuration information identifies one or more additional computing devices configured to receive indications of effectiveness of the advertisement, and wherein sending the indication of effectiveness of the advertisement comprises sending the indication of effectiveness of the advertisement to the one or more additional computing devices.

46. The system of claim 43, wherein the third instructions, when executed by the one or more third processors, further cause the third computing device to:
restrict, based on the determining, user access to a control of the display.

47. The system of claim 43, wherein the third instructions, when executed by the one or more third processors, further cause the third computing device to:
receive, based on sending the indication of effectiveness of the advertisement, updated configuration information restricting obscuring of one or more portions of one or more additional advertisements; and
cause output of a second advertisement of the one or more additional advertisements.

48. The system of claim 43, wherein the first instructions, when executed by the one or more first processors, further cause the first computing device to:
send, to the second computing device and based on the indication of effectiveness of the advertisement, a credit for the second computing device.

49. The system of claim 43, wherein:
the advertisement is associated with an indication of one or more webpages that are permitted to obscure the advertisement without pausing the advertisement; and
the content item is a webpage different from the one or more webpages.

50. The system of claim 43, wherein the advertisement is associated with an indication of one or more webpages that are permitted to obscure the advertisement, and wherein the indication of effectiveness of the advertisement comprises an indication that the advertisement was obscured by a webpage of the one or more webpages that are permitted to obscure the advertisement.

51. The system of claim 43, wherein the third instructions, when executed by the one or more third processors, further cause the third computing device to:
activate, based on the configuration information, closed captioning associated with the advertisement.

52. One or more non-transitory computer readable medium storing instructions that, when executed, cause:
causing, by a computing device, output of an advertisement;
determining that a content item obscures at least a portion of the advertisement being output via a display; and
based on the portion of the advertisement being a certain portion of the advertisement that is restricted from being obscured, pausing the advertisement being output via the display.

53. The one or more non-transitory computer readable medium of claim 52, wherein the portion of the advertisement is at least one of:
a spatial portion of the advertisement; or
a temporal portion of the advertisement.

54. The one or more non-transitory computer readable medium of claim 52, wherein the instructions, when executed, further cause:
restricting, based on the determining, user access to a control of the display.

55. The one or more non-transitory computer readable medium of claim 52, wherein the instructions, when executed, cause the determining by receiving a user input via an application window different from the advertisement.

56. The one or more non-transitory computer readable medium of claim 52, wherein:
the advertisement is associated with an indication of one or more webpages that are permitted to obscure the advertisement without pausing the advertisement; and
the content item is a webpage different from the one or more webpages.

57. The one or more non-transitory computer readable medium of claim 52, wherein the instructions, when executed, further cause unpausing the advertisement based on determining that the content item no longer obscures the portion.

58. The one or more non-transitory computer readable medium of claim 52, wherein both the advertisement and the content item are simultaneously presented via the display when the content item obscures the portion of the advertisement.

59. One or more non-transitory computer readable medium storing instructions that, when executed, cause:
   causing, by a first computing device, output of an advertisement;
   determining that a content item obscures at least a first portion of the advertisement being output via a display;
   generating, based on configuration information restricting obscuring of the first portion of the advertisement and permitting obscuring of a second portion of the advertisement, an indication of effectiveness of the advertisement; and
   sending, to a second computing device, the indication of effectiveness of the advertisement.

60. The one or more non-transitory computer readable medium of claim 59, wherein the indication of effectiveness of the advertisement comprises:
   an indication of an event that caused the first portion of the advertisement to be obscured; and
   an indication of a time at which the event that caused the first portion of the advertisement to be obscured occurred.

61. The one or more non-transitory computer readable medium of claim 59, wherein the configuration information identifies one or more additional computing devices configured to receive indications of effectiveness of the advertisement, and wherein the instructions, when executed, cause the sending the indication of effectiveness of the advertisement by sending the indication of effectiveness of the advertisement to the one or more additional computing devices.

62. The one or more non-transitory computer readable medium of claim 59, wherein the instructions, when executed, further cause:
   receiving, based on sending the indication of effectiveness of the advertisement, updated configuration information restricting obscuring of one or more portions of one or more additional advertisements; and
   causing, by the first computing device, output of a second advertisement of the one or more additional advertisements.

63. The one or more non-transitory computer readable medium of claim 59, wherein the instructions, when executed, further cause:
   sending, to the second computing device and based on the indication of effectiveness of the advertisement, a credit for the second computing device.

64. The one or more non-transitory computer readable medium of claim 59, wherein the advertisement is associated with an indication of one or more webpages that are permitted to obscure the advertisement, and wherein the indication of effectiveness of the advertisement comprises an indication that the advertisement was obscured by a webpage of the one or more webpages that are permitted to obscure the advertisement.

\* \* \* \* \*